(12) United States Patent
Lee

(10) Patent No.: US 10,990,476 B2
(45) Date of Patent: Apr. 27, 2021

(54) MEMORY CONTROLLER AND METHOD OF OPERATING THE SAME

(71) Applicant: SK hynix Inc., Icheon-si (KR)

(72) Inventor: Jong Hwan Lee, Hwaseong-si (KR)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 16/696,860

(22) Filed: Nov. 26, 2019

(65) Prior Publication Data

US 2020/0401479 A1   Dec. 24, 2020

(30) Foreign Application Priority Data

Jun. 18, 2019   (KR) .......................... 10-2019-0072179

(51) Int. Cl.
  *G06F 11/10* (2006.01)
  *G06F 12/10* (2016.01)
(52) U.S. Cl.
  CPC .......... *G06F 11/1068* (2013.01); *G06F 12/10* (2013.01); *G06F 2212/1032* (2013.01)
(58) Field of Classification Search
  CPC ................. G06F 11/1068; G06F 12/10; G06F 2212/1032
  See application file for complete search history.

(56) References Cited

U.S. PATENT DOCUMENTS

| 10,318,414 | B2* | 6/2019 | Bellorado | ........... G06F 12/0253 |
| 2013/0272078 | A1* | 10/2013 | Nakanishi | ........... G11C 7/1006 |
| | | | | 365/190 |
| 2017/0046210 | A1* | 2/2017 | Yim | ....................... G11C 16/10 |
| 2017/0125127 | A1* | 5/2017 | Kim | ..................... G06F 11/1048 |
| 2017/0249201 | A1* | 8/2017 | Yl | ............................ G11C 16/26 |
| 2018/0074894 | A1* | 3/2018 | Sakurada | .............. G06F 3/0655 |
| 2020/0090763 | A1* | 3/2020 | Tokutomi | ........... G11C 16/0483 |

FOREIGN PATENT DOCUMENTS

KR   10-2015-0130633 A   11/2015
KR   10-2016-0008786 A   1/2016

* cited by examiner

*Primary Examiner* — Kyle Vallecillo

(57) ABSTRACT

Provided herein may be a memory controller and a method of operating the memory controller. The memory controller may control a memory device that stores data, and may include a bit counter configured to generate a count value by counting any one of bits in a programmed state and an erased state contained in the data, a flash translation layer configured to generate page information indicating an address of the data stored in the memory device, an additional data generator configured to generate judgment data for determining whether the data has changed, based on the count value and the page information, a comparator configured to generate comparison information by comparing the judgment data with detection data generated based on data read from the memory device, and a read data controller configured to perform an operation of correcting an error in the read data based on the comparison information.

20 Claims, 11 Drawing Sheets

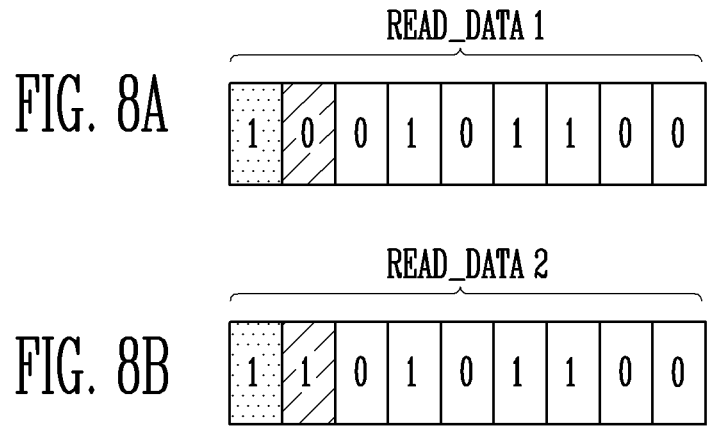
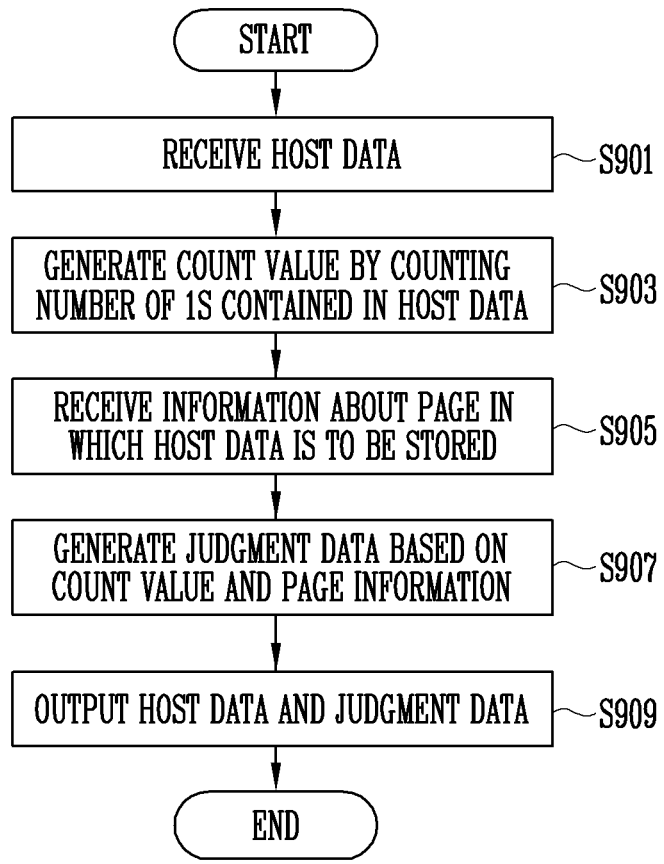

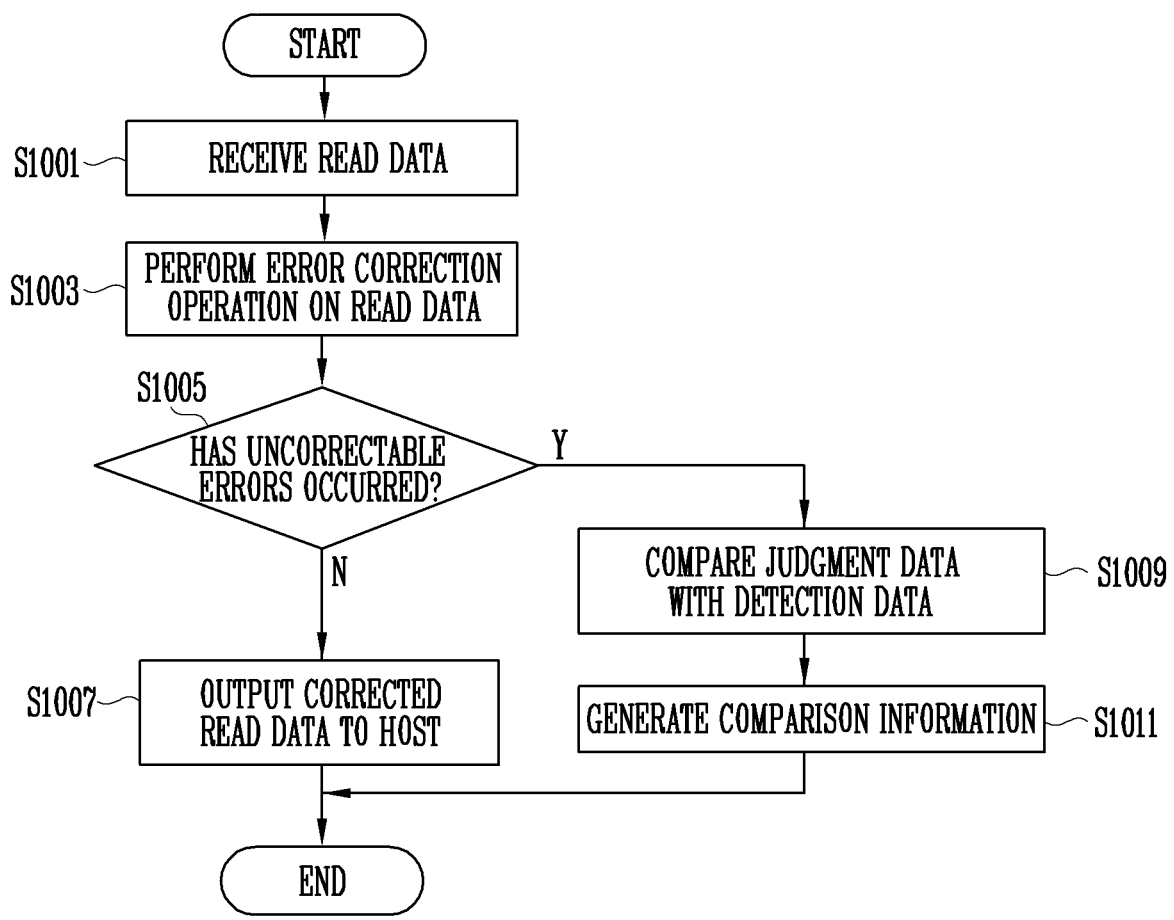

US 10,990,476 B2

MEMORY CONTROLLER AND METHOD OF OPERATING THE SAME

CROSS-REFERENCE TO RELATED APPLICATION

The present application claims priority under 35 U.S.C. § 119(a) to Korean patent application number 10-2019-0072179 filed on Jun. 18, 2019 in the Korean Intellectual Property Office, the entire disclosure of which is incorporated herein by reference.

BACKGROUND

1. Technical Field

Various embodiments of the present disclosure generally relate to an electronic device, and more particularly, to a memory controller and a method of operating the memory controller.

2. Related Art

A storage device is a device which stores data under the control of a host device such as a computer, a smartphone, or a smartpad. Non-limiting examples of storage devices include devices such as hard disk drives (HDD) which store data in a magnetic disk, and devices such as a solid state drives (SSD) or memory cards which store data in a semiconductor memory, and nonvolatile memory devices.

A storage device may include a memory device in which data is stored and a memory controller that controls the storage of data in the memory device. The memory devices may be classified into volatile memory devices and non-volatile memory devices. Representative examples of the nonvolatile memory include a read only memory (ROM), a programmable ROM (PROM), an electrically programmable ROM (EPROM), an electrically erasable programmable ROM (EEPROM), a flash memory, a phase-change random access memory (PRAM), a magnetic RAM (MRAM), a resistive RAM (RRAM), and a ferroelectric RAM (FRAM).

SUMMARY

Various embodiments of the present disclosure are directed to a memory controller that enables uncorrectable errors to be corrected and methods of operating the memory controller.

An embodiment of the present disclosure may provide for a memory controller for controlling a memory device that stores data. The memory controller may include a bit counter configured to generate a first count value by counting a number of bits in a host data to be programmed at an address in the memory device in response to a program request received from a host, a flash translation layer configured to generate a first page information indicating the address of the programmed data stored in the memory device, an additional data generator configured to generate a judgment data based on the first count value and the first page information, a comparator configured to generate a comparison information by comparing the judgment data with detection data, wherein the detection data is generated using the programmed data read from the memory device in response to a read request received from the host and a read data controller configured to perform an operation of correcting an error in the programmed data read from the memory device based on the comparison information.

An embodiment of the present disclosure may provide for a method of operating a memory controller for controlling a memory device that stores data. The method may include receiving host data from a host, generating a first count value by counting a bit in a programmed state or an erased state contained in the host data, generating a first page information indicating an address of a page in which the host data is to be stored, among pages included in the memory device, generating judgment data based on the first count value and the first page information, generating detection data based on programmed data read from the memory device, generating comparison information by comparing the judgment data with the detection data and performing an operation of correcting an error in the programmed data read from the memory device based on the comparison information.

BRIEF DESCRIPTION OF THE DRAWINGS

FIGS. 8A and 8B are diagrams illustrating an operation of correcting an uncorrectable error according to an embodiment of the disclosure.

FIG. 9 is a flowchart illustrating an operation of a memory controller according to an embodiment of the present disclosure.

FIG. 10 is a flowchart illustrating an operation of a memory controller according to an embodiment of the present disclosure.

DETAILED DESCRIPTION

Figure 1:
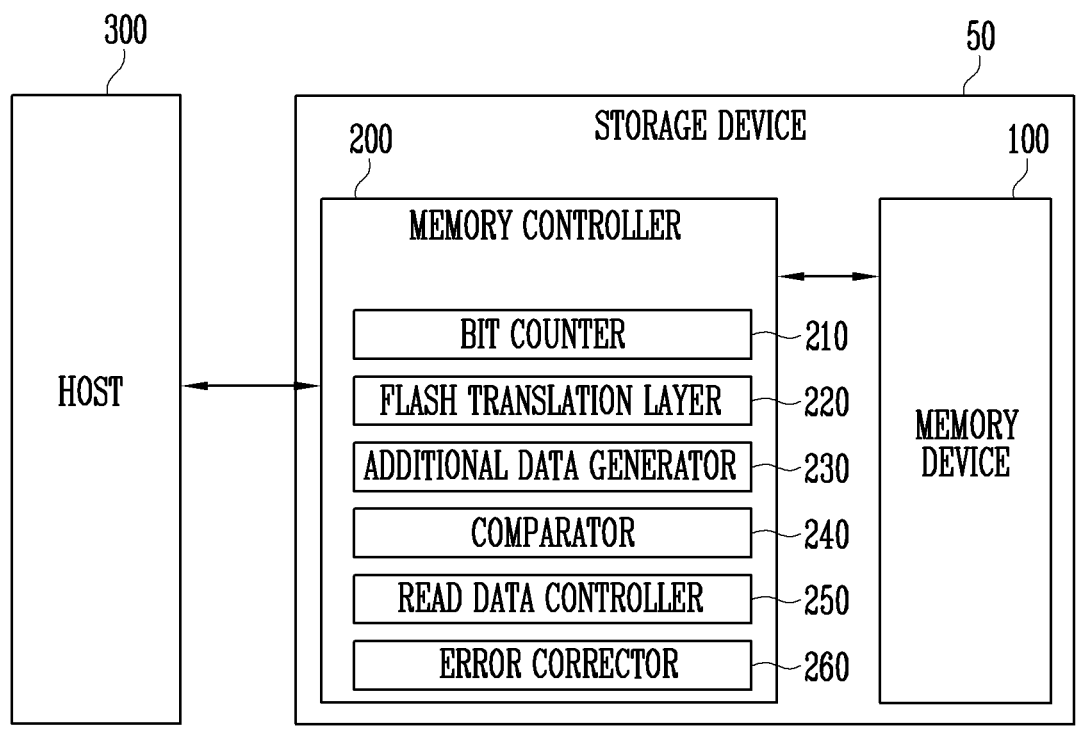
FIG. 1 is a block diagram illustrating a storage device according to an embodiment of the disclosure.

Specific structural or functional descriptions in the embodiments of the present disclosure introduced in this specification or application are only for the purpose of describing embodiments of the present disclosure. The descriptions should not be construed as limiting embodiments contemplated by the disclosure to those described in the specification or application.

The present disclosure will now be described in detail based on embodiments. The present disclosure may, however, be embodied in many different forms and should not be construed as being limited to only the embodiments set forth herein, but should be construed as covering modifications, equivalents or alternatives falling within ideas and technical scopes of the present disclosure. However, this is not intended to limit the present disclosure to particular modes of practice, and it is to be appreciated that all changes, equivalents, and substitutes that do not depart from the spirit and technical scope of the present disclosure are encompassed in the present disclosure.

It will be understood that, although the terms "first" and/or "second" may be used herein to describe various elements, these elements are not be limited by these terms. These terms are only used to distinguish one element from another element in this specification. For instance, a first element discussed below could be termed a second element without departing from the teachings of the present disclosure, and similarly, the second element could also be termed the first element.

It will be understood that when an element is referred to as being "coupled" or "connected" to another element, it can be directly coupled or connected to the other element or intervening elements may be present therebetween. In contrast, it should be understood that when an element is referred to as being "directly coupled" or "directly connected" to another element, there are no intervening elements present. Other expressions that explain the relationship between elements, such as "between", "directly between", "adjacent to" or "directly adjacent to" should be construed in the same way.

The terminology used herein is for the purpose of describing particular embodiments only and is not intended to be limiting. In the present disclosure, the singular forms are intended to include the plural forms as well, unless the context clearly indicates otherwise. It will be further understood that the terms "comprise", "include", "have", etc. when used in this specification, specify the presence of stated features, numbers, parts, steps, operations, elements, components, and/or combinations of them but do not preclude the presence or addition of one or more other features, numbers, parts, steps, operations, elements, components, and/or combinations thereof.

Unless otherwise defined, all terms including technical and scientific terms used herein have the same meaning as commonly understood by one of ordinary skill in the art to which the present disclosure belongs. It will be further understood that terms used herein should be interpreted as having a meaning that is consistent with their meaning in the context of this specification and the relevant art, and will not be interpreted in an idealized or overly formal sense unless expressly so defined herein.

Detailed description of functions and structures well-known to those skilled in the art will be omitted to avoid obscuring the subject matter of the present disclosure. This aims to omit unnecessary description so as to make the subject matter of the present disclosure clear.

Various embodiments of the present disclosure will now be described more fully hereinafter with reference to the accompanying drawings, in which preferred embodiments of the present disclosure are illustrated, so that those of ordinary skill in the art can easily carry out the technical idea of the present disclosure.

FIG. 1 is a block diagram illustrating a storage device according to an embodiment of the disclosure.

Referring to FIG. 1, a storage device 50 may include a memory device 100, a memory controller 200, and a buffer memory (not illustrated).

The storage device 50 may be a device which stores data under the control of a host 300, such as a mobile phone, a smartphone, an MP3 player, a laptop computer, a desktop computer, a game console, a television (TV), a tablet PC, or an in-vehicle infotainment system as non-limiting examples.

The storage device 50 may be manufactured as any one of various types of storage devices depending on a host interface that is a scheme for communication with the host 300. For example, the storage device 50 may be implemented as any one of various types of storage devices, such as, for example, a solid state disk (SSD), a multimedia card (MMC), an embedded MMC (eMMC), a reduced size MMC (RS-MMC), or a micro-MMC, a secure digital card (SD), a mini-SD, or a micro-SD, a universal storage bus (USB) storage device, a universal flash storage (UFS) device, a personal computer memory card international association (PCMCIA) card-type storage device, a peripheral component interconnection (PCI)-card type storage device, a PCI express (PCI-E) card-type storage device, a compact flash (CF) card, a smart media card, and a memory stick.

The storage device 50 may be manufactured in any one of various types of package forms. For example, the storage device 50 may be manufactured as a package on package (POP), system in package (SIP), system on chip (SOC), multi-chip package (MCP), chip on board (COB), wafer-level fabricated package (WFP), and wafer-level stack package (WSP).

The memory device 100 may store data. The memory device 100 is operated in response to or under the control of the memory controller 200. The memory device 100 may include a memory cell array including a plurality of memory cells that store data. The memory cell array may include a plurality of memory blocks. Each memory block may include a plurality of memory cells, which may constitute a plurality of pages. In an embodiment, each page may be a unit in which data is stored in the memory device 100, or in which data stored in the memory device 100 is read. A memory block may be a unit from which data is erased.

In an embodiment, the memory device 100 may take many alternative forms, such as a double data rate synchronous dynamic random access memory (DDR SDRAM), a low power double data rate fourth generation (LPDDR4) SDRAM, a graphics double data rate (GDDR) SDRAM, a low power DDR (LPDDR) SDRAM, a Rambus dynamic random access memory (RDRAM), a NAND flash memory, a vertical NAND flash memory, a NOR flash memory device, a resistive RAM (RRAM), a phase-change memory (PRAM), a magnetoresistive RAM (MRAM), a ferroelectric RAM (FRAM), or a spin transfer torque RAM (STT-RAM). In the present specification, for convenience of description, descriptions will assume that the memory device 100 is a NAND flash memory.

The memory device 100 may be implemented in a two-dimensional (2D) array structure or a three-dimensional (3D) array structure. Hereinafter, although a 3D array structure is described as an embodiment, the present disclosure is not limited thereto. The present disclosure may also be applied not only to a flash memory device in which a charge storage layer is formed of a conductive floating gate (FG), but also to a charge trap flash (CTF) memory device in which a charge storage layer is formed of an insulating layer.

In an embodiment, the memory device 100 may be operated in a single-level cell (SLC) manner in which one data bit is stored in one memory cell. Alternatively, the memory device 100 may be operated in a manner in which at least two data bits are stored in one memory cell. For example, the memory device 100 may be operated in a multi-level cell (MLC) manner in which two data bits are stored in one memory cell, a triple-level cell (TLC) manner in which three data bits are stored in one memory cell, or a quadruple-level cell (QLC) manner in which four data bits are stored in one memory cell.

The memory device 100 may receive a command and an address from the memory controller 200, and may access an area of the memory cell array selected by the address. That is, the memory device 100 may perform an operation in response to a command on an area selected by the address. As examples, the memory device 100 may perform a write operation (i.e., program operation), a read operation or an erase operation in response to a received command. When a program command is received, the memory device 100 may program data to the area selected by the address. When a read command is received, the memory device 100 may read data from the area selected by the address. When an erase command is received, the memory device 100 may erase data stored in the area selected by the address.

The memory controller 200 may include a bit counter 210. The bit counter 210 may count the number of 1s contained in a host data received from the host 300 or in a read data received from the memory device 100 during a read operation. In another embodiment, the bit counter 210 may count the number of 0s contained in the read data or the host data.

The bit counter 210 may count the number of 1s contained in the data and then generate a new data. The new data may be included in judgment data or detection data. The judgment data may include data generated based on the host data received from the host 300. The detection data may include data generated based on the read data received from the memory device 100.

The memory controller 200 may include a flash translation layer (FTL) 220. The flash translation layer 220 may store and manage information about mapping between a logical block address (LBA) received from the host 300 and a physical block address (PBA). That is, the flash translation layer 220 may translate the logical block address (LBA) received from the host 300 into the physical block address (PBA). When the memory controller 200 receives a program request or a read request from the host 300, the flash translation layer 220 may generate, using the logical block address (LBA) received from the host 300, page information that includes the mapping information of the physical block address (PBA) corresponding to the logical block address (LBA).

The memory controller 200 may include an additional data generator 230. The additional data generator 230 may generate an additional data. The additional data may be data stored in the memory device 100, and may include host data and judgment data. The host data may include data to be programmed to the memory device 100, and may be received from the host 300. The judgment data may be generated based on the number of 1s contained in the host data received from the host 300 and based on the index or address of a page to which the host data is to be programmed. In another embodiment, the judgment data may be generated based on the number of 0s contained in the host data received from the host 300.

In an embodiment, the host data may be stored in a user area of the memory device 100. The judgment data may be stored in a spare area of the memory device 100.

In an embodiment, the additional data generator 230 may generate the judgment data, and may then store the judgment data. Thereafter, during a read operation, the additional data generator 230 may output the judgment data to be compared with the detection data generated based on the data read from the memory device 100.

The memory controller 200 may include a comparator 240. The comparator 240 may compare the judgment data with the detection data.

In an embodiment, the judgment data may include data that is generated based on the host data when a program request is received from the host 300. That is, the judgment data may be a value obtained by summing the number of 1s contained in the host data and a number calculated based on a page address or index indicating a location at which the host data is to be programmed.

The detection data may include data generated based on the read data received from the memory device 100 during the read operation. That is, the detection data may be a value obtained by summing the number of 1s contained in the read data and a number calculated based on the page address or index indicating the location of a page from which the read data is read.

In an embodiment, the comparator 240 may compare the judgment data with the detection data when an uncorrectable error occurs. When the judgment data is not identical to the detection data, the comparator 240 may generate comparison information including information about the difference between the judgment data and the detection data, and may transfer the comparison information.

The memory controller 200 may include an error corrector 260. The error corrector 260 may correct errors in data read from the memory device 100.

For example, the memory controller 200 may receive data different from the host data in the memory device 100. That is, the data stored in and read from the memory device 100 may be changed due to degradation from temperature changes or from deterioration of retention characteristics, or alternatively, changed data may be read due to disturbances in read operations. In such cases, the error corrector 260 may correct errors contained in data in which the errors have occurred or have been detected.

However, an uncorrectable error may occur even though an operation of the error corrector 260 is performed. When an uncorrectable error occurs, conventional technology processes a memory block including a page in which read data is stored as a bad block, but embodiments of the present disclosure may correct the uncorrectable error by changing the bits of the read data instead of the entire block or page.

In an embodiment, when it is determined that an uncorrectable error has occurred, the error corrector 260 may output information to the read data controller 250 indicating that a fail attributable to the uncorrectable error has occurred, and the read data controller 250 may control the read data so that the uncorrectable error is corrected by changing bits of the read data as required.

The read data controller 250 may control the data read from the memory device 100. More specifically, when an uncorrectable error occurs as described above, the read data controller 250 may change the read data. That is, the read data controller 250 may change "0" contained in the read data to "1" or change "1" contained in the read data to "0". Thus, the read data controller 250 may control the read data so that the uncorrectable error may be corrected by changing "0" or "1" contained in the read data. The read data controller 250 may output the corrected data to the host 300.

The memory controller 200 may control the overall operation of the storage device 50.

When power is applied to the storage device 50, the memory controller 200 may run firmware (FW). In an embodiment, when the memory device 100 is a flash memory device 100, the memory controller 200 may run firmware such as a flash translation layer (FTL) for controlling communication between the host 300 and the memory device 100.

In an embodiment, the memory controller 200 may receive data and a logical block address (LBA) from the host 300, and may translate the logical block address (LBA) into a physical block address (PBA), indicating the address of memory cells of the memory device 100 in which data is to be stored. Further, the memory controller 200 may store, in a buffer memory, a logical-physical address mapping table, which configures mapping relationships between logical block addresses (LBA) and physical block addresses (PBA).

The memory controller 200 may control the memory device 100 so that a program operation, a read operation or an erase operation is performed in response to a request received from the host 300. For example, when a program request together with a logical block address is received from the host 300, the memory controller 200 may convert the program request into a program command, and may provide the program command, a physical block address (PBA) corresponding to the logical block address, and data to be programmed to the memory device 100. When a read request together with a logical block address is received from the host 300, the memory controller 200 may convert the read request into a read command, select a physical block address corresponding to the logical block address, and thereafter provide the read command and the physical block address (PBA) to the memory device 100. When an erase request together with a logical block address is received from the host 300, the memory controller 200 may convert the erase request into an erase command, select a physical block address corresponding to the logical block address, and thereafter provide the erase command and the physical block address (PBA) to the memory device 100.

In an embodiment, the memory controller 200 may autonomously generate a program command, an address, and data in the absence of a request from the host 300, and may transmit them to the memory device 100. For example, the memory controller 200 may provide commands, addresses, and data to the memory device 100 so as to perform background operations, such as a program operation for wear leveling, and a program operation for garbage collection.

In an embodiment, the memory controller 200 may control data exchange between the host 300 and a buffer memory (not illustrated). Alternatively, the memory controller 200 may temporarily store system data for controlling the memory device 100 in the buffer memory (not illustrated). For example, the memory controller 200 may temporarily store data, input from the host 300, in the buffer memory, and may then transmit the data that was temporarily stored in the buffer memory, to the memory device 100.

In various embodiments, the buffer memory may be used as a working memory or a cache memory for the memory controller 200. The buffer memory may store codes or commands that are executed by the memory controller 200. Alternatively, the buffer memory may store data that is processed by the memory controller 200.

In embodiments, the buffer memory may be implemented as a DRAM such as a double data rate SDRAM (DDR SDRAM), a double data rate fourth generation (DDR4) SDRAM, a low power double data rate fourth generation (LPDDR4) SDRAM, a graphics double data rate (GDDR) SDRAM, a low power DDR (LPDDR) SDRAM, or a Rambus DRAM (RDRAM), or as a static RAM (SRAM).

In some embodiments, the storage device 50 does not include the buffer memory. In such instances, other volatile memory devices external to the storage device 50 may function as the buffer memory.

In an embodiment, the memory controller 200 may control at least two memory devices 100. In such cases, the memory controller 200 may control the memory devices 100 using an interleaving or alternating scheme to improve operating performance.

The host 300 may communicate with the storage device 50 using at least one of various communication methods, such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), Multi-Media Card (MMC), embedded MMC (eMMC), Dual In-line Memory Module (DIMM), Registered DIMM (RDIMM), and Load Reduced DIMM (LRDIMM) communication methods, by way of non-limiting examples.

Figure 2:
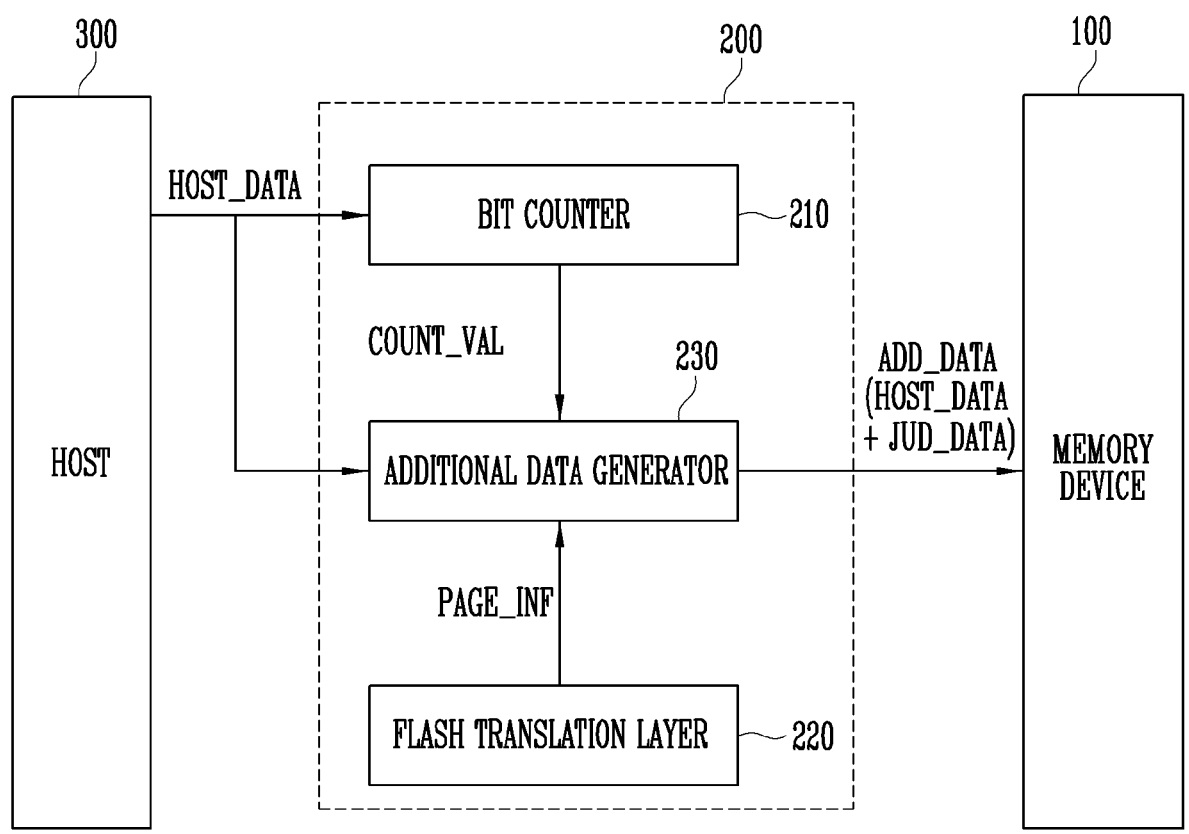
FIG. 2 is a diagram illustrating a configuration of a memory controller of FIG. 1 and types of data according to an embodiment of the disclosure.

FIG. 2 is a diagram illustrating a configuration of the memory controller of FIG. 1 according to an embodiment of the disclosure.

FIG. 2 illustrates an operation of a memory controller 200 when a program request is received from a host 300.

Referring to FIG. 2, the memory controller 200 of FIG. 2 may include a bit counter 210, a flash translation layer (FTL) 220, and an additional data generator 230. In the memory controller 200 of FIG. 2, a comparator (e.g., 240 of FIG. 1) and a read data controller (e.g., 250 of FIG. 1) are omitted for convenience of description.

The bit counter 210 may receive a host data HOST_DATA from the host 300. The host data HOST_DATA may be composed of "0" and "1" (i.e., 0s and 1s).

The host data HOST_DATA may be data to be programmed to the memory device 100. That is, the host data HOST_DATA may be data corresponding to a program request received from the host 300. Therefore, when the memory controller 200 receives the host data HOST_DATA corresponding to the program request and a write request from the host 300, the bit counter 210 receives the host data HOST_DATA from the host 300.

In an embodiment, the bit counter 210 may count the number of 1s contained in the host data HOST_DATA. The bit counter 210 may generate a count value COUNT_VAL by counting the number of 1s contained in the host data HOST_DATA. Additional data generator 230 may be generate a judgment data JUD_DATA using the count value COUNT_VAL generated by the bit counter 210 using the host data HOST_DATA.

The flash translation layer 220 may generate page information PAGE_INF. The page information PAGE_INF may be generated based on the address of a page to which the host data HOST_DATA is to be programmed, or based on the index of the page to which the host data HOST_DATA is to be programmed. In an embodiment, the page information PAGE_INF may include a value obtained by performing a modulo operation on the address or the index of the page to which the host data HOST_DATA is to be programmed. The modulo operation may be a method of calculating a remainder when a target value is divided by a reference value.

In an embodiment, when the memory controller 200 receives the program request from the host 300, the memory controller 200 may receive a logical block address together with the host data HOST_DATA from the host 300. The memory controller 200 may output a physical block address (PBA) corresponding to the logical block address (LBA) to the memory device 100. Here, the flash translation layer 220 may select the physical block address (PBA) by forming a mapping relationship between the logical block address (LBA) and the physical block address (PBA). The physical block address (PBA) may be the address of a memory block or the address of a page.

That is, when the memory controller 200 receives a program request from the host 300, the flash translation layer 220 may output to the additional data generator 230 page information PAGE_INF, which includes a value obtained by performing a modulo operation on the address of a memory block or a page (such address corresponding to a location to which host data HOST_DATA is to be programmed), while also outputting the address of the memory block or the page corresponding to a location to which the host data HOST_DATA is to be programmed to the memory device 100.

The additional data generator 230 may generate additional data ADD_DATA. The additional data ADD_DATA may contain the host data HOST_DATA and the judgment data JUD_DATA.

In an embodiment, the additional data generator 230 may receive the host data HOST_DATA from the host 300. The host data HOST_DATA may be data to be programmed to the memory device 100. The additional data generator 230 may generate additional data ADD_DATA containing the host data HOST_DATA. The host data HOST_DATA, among pieces of data contained in the additional data ADD_DATA, may be data stored in a user area of the memory device 100.

In an embodiment, the additional data generator 230 may receive the count value COUNT_VAL from the bit counter 210 and receive the page information PAGE_INF from the flash translation layer 220. The additional data generator 230 may generate the judgment data JUD_DATA based on the count value COUNT_VAL and the page information PAGE_INF. That is, the additional data generator 230 may generate additional data ADD_DATA containing the judgment data JUD_DATA. The judgment data JUD_DATA contained in the additional data ADD_DATA may be stored in the additional data generator 230 and/or in a spare area of the memory device 100. Accordingly, the judgment data JUD_DATA also may be received from the additional data generator 230 and/or the memory device 100.

For example, each of a plurality of memory blocks included in a memory cell array of the memory device 100 may be divided into a user area in which data is stored and a spare area. The spare area may store data related to the data stored in the user area, or the spare area can replace the user area when the user area is not sufficiently secured. When the data related to the data stored in the user area is stored in the spare area, data related to the location or size of the data stored in the user area may also be stored in the spare area. Accordingly, various types of data may be stored in the spare area in embodiments contemplated by the disclosure.

Therefore, in embodiments of the present disclosure, the host data HOST_DATA may be stored in the user area, and the judgment data JUD_DATA may be stored in the spare area of the memory device 100.

As a result, the additional data generator 230 may generate the additional data ADD_DATA containing the host data HOST_DATA and the judgment data JUD_DATA, and may output the generated additional data ADD_DATA to the memory device 100. Based on the additional data ADD_DATA received from the memory controller 200, the memory device 100 may program the host data HOST_DATA contained in the additional data ADD_DATA to the user area of the memory cell array, and program the judgment data JUD_DATA to the spare area of the memory cell array. When the additional data generator 230 stores the judgment data JUD_DATA, the judgment data JUD_DATA may not be stored in the spare area of the memory cell array.

Figure 3:
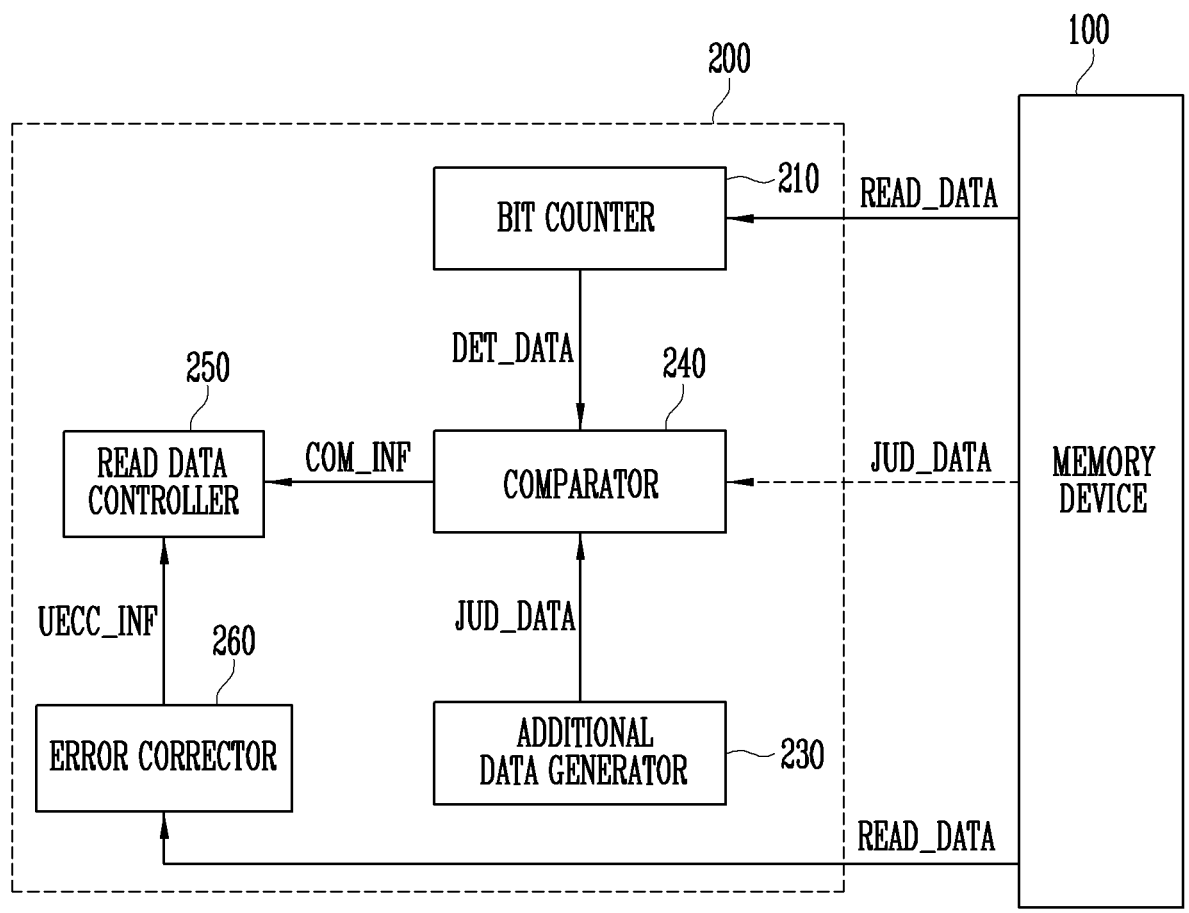
FIG. 3 is a diagram illustrating a configuration of a memory controller of FIG. 1 according to an embodiment of the disclosure.

FIG. 3 is a diagram illustrating a configuration of the memory controller of FIG. 1 according to an embodiment of the disclosure.

FIG. 3 illustrates an operation of a memory controller 200 in an example in which a read request is received from a host (e.g., host 300 of FIG. 2), the memory device 100 performs a read operation, and an uncorrectable error occurs as a result of performing the read operation.

Referring to FIG. 3, the memory controller 200 of FIG. 3 may include a bit counter 210, an additional data generator 230, a comparator 240, a read data controller 250, and an error corrector 260. In the memory controller 200 of FIG. 3, a flash translation layer is omitted for convenience of description.

In an embodiment, data different from host data (i.e., different from HOST_DATA of FIG. 2) may be read. That is, host data has been programmed to the memory device 100 in response to a program request received from the host (e.g., host 300 of FIG. 2), but the data stored in the memory device 100 may be changed, or the corresponding data may be modified during a procedure for reading the data stored in the memory device 100. In such instances, although the host data was programmed to the memory device 100, data different from the original programmed host data may be read.

In detail, the data stored in the memory device 100 may be changed due to degradation from temperature changes or from deterioration in retention characteristics of a storage device (e.g., storage device 50 of FIG. 1). That is, although the host data received from the host (e.g., host 300 of FIG. 2) is stored in the memory device 100, the stored data may undergo changes such that the stored data is different from the original host data provided by host 300. In such examples, when the data stored in the memory device 100 is read in response to a read request from the host, the data that is read may be different from the host data that was originally stored in the memory device 100.

In another example, the data that was stored in the memory device 100 is also altered due to disturbance from the read operation so that data different from the originally stored host data may be subsequently read.

When data different from the originally programmed host data is read in response to a read request from the host, errors may occur. The memory controller 200 may perform an operation to correct errors in the retrieved host data.

More specifically, the error corrector 260 may receive read data READ_DATA from the memory device 100. However, as described above, the read data READ_DATA may be data different from the host data. That is, although the host data received from the host (e.g., host 300 of FIG. 2) has been stored in the memory device 100, when read from the memory device 100, different data may be obtained. In this case, the error corrector 260 may correct errors in the read data READ_DATA.

Even after the error corrector 260 has performed an error correction operation, not all of the errors in the read data may be corrected. When at least one error in the read data remains uncorrected, the error corrector 260 may generate uncorrectable error information (i.e., uncorrectable error correction code information) UECC_INF and output the uncorrectable error information UECC_INF to the read data controller 250.

In the event an uncorrectable error occurs, the memory controller 200 may process, as a bad block, a memory block in which the corresponding data is stored.

However, the present disclosure proposes methods of correcting the uncorrectable error while avoiding processing the memory block in which read data READ_DATA is stored as a bad block.

In an embodiment, the bit counter 210 may receive the read data READ_DATA from the memory device 100. The read data READ_DATA may be data obtained by reading data stored in the memory device 100 in response to a read request received from the host (e.g., host 300 of FIG. 2). The read data READ_DATA may be composed of a plurality of "0"s and "1"s.

The bit counter 210 may generate detection data DET_DATA by summing a count value, which is generated by counting the number of 1s contained in the read data READ_DATA, and a value, which is obtained by performing a modulo operation on the address or index of the page from which the read data READ_DATA is read. The detection data DET_DATA may be a value that is compared with the judgment data JUD_DATA. The modulo operation may be a method of calculating a remainder when a target value is divided by a reference value.

The comparator 240 may receive the detection data DET_DATA from the bit counter 210 and receive the judgment data JUD_DATA from the additional data generator 230. The detection data DET_DATA may include data generated based on the count value, which is generated by counting the number of 1s contained in the read data READ_DATA, and the value, which is obtained by performing a modulo operation on the address or index of the page from which the read data is read. The judgement data JUD_DATA may include data generated based on the host data received from the host (e.g., host 300 of FIG. 2) and a value obtained by performing a modulo operation on the address or index of a page on which a program operation is to be performed.

In an embodiment, when the judgment data JUD_DATA is stored in a spare area of the memory device 100, the judgment data JUD_DATA may be received from the memory device 100. That is, because the judgment data JUD_DATA may be stored in the additional data generator 230 and/or the memory device 100, the judgment data JUD_DATA may be received from the additional data generator 230 and/or the memory device 100.

In an embodiment, the comparator 240 may compare the judgment data JUD_DATA with the detection data DET_DATA.

In detail, when the judgment data JUD_DATA is identical to the detection data DET_DATA, it may be determined that the host data matches the read data READ_DATA, and thus the comparator 240 does not generate comparison information COM_INF. In contrast, when the judgment data JUD_DATA is not identical to the detection data DET_DATA, it may be determined that the host data does not match the read data READ_DATA, and thus the comparator 240 may generate comparison information COM_INF.

The comparison information COM_INF may contain information about the difference between a value contained in the judgment data JUD_DATA and a value contained in the detection data DET_DATA. The comparator 240 may generate the comparison information COM_INF and output the comparison information COM_INF to the read data controller 250.

The read data controller 250 may receive the comparison information COM_INF from the comparator 240. The comparison information COM_INF may indicate that the host data, corresponding to the program request received from the host (e.g., host 300 of FIG. 2), does not match the read data READ_DATA that corresponds to the read request received from the host (e.g., host 300 of FIG. 2). Receiving the comparison information COM_INF, the read data controller 250 may perform an operation to correct uncorrectable errors.

Further, the read data controller 250 may receive the uncorrectable error information UECC_INF from the error corrector 260. The uncorrectable error information UECC_INF may be output from the error corrector 260 when errors are not corrected or when error correction is incomplete. If uncorrectable error information UECC_INF is received from the error corrector 260, then the read data controller 250 may perform an operation to correct uncorrectable errors.

Consequently, the read data controller 250 may perform an operation of correcting uncorrectable errors when the comparison information COM_INF is received from the comparator 240 or when the uncorrectable error information UECC_INF is received from the error corrector 260.

In an embodiment, the read data controller 250 may receive the comparison information COM_INF and/or the uncorrectable error information UECC_INF, and may change a "0" contained in the read data READ_DATA to a "1" on a bit-by-bit basis until the errors in the read data READ_DATA are corrected.

Figure 4:
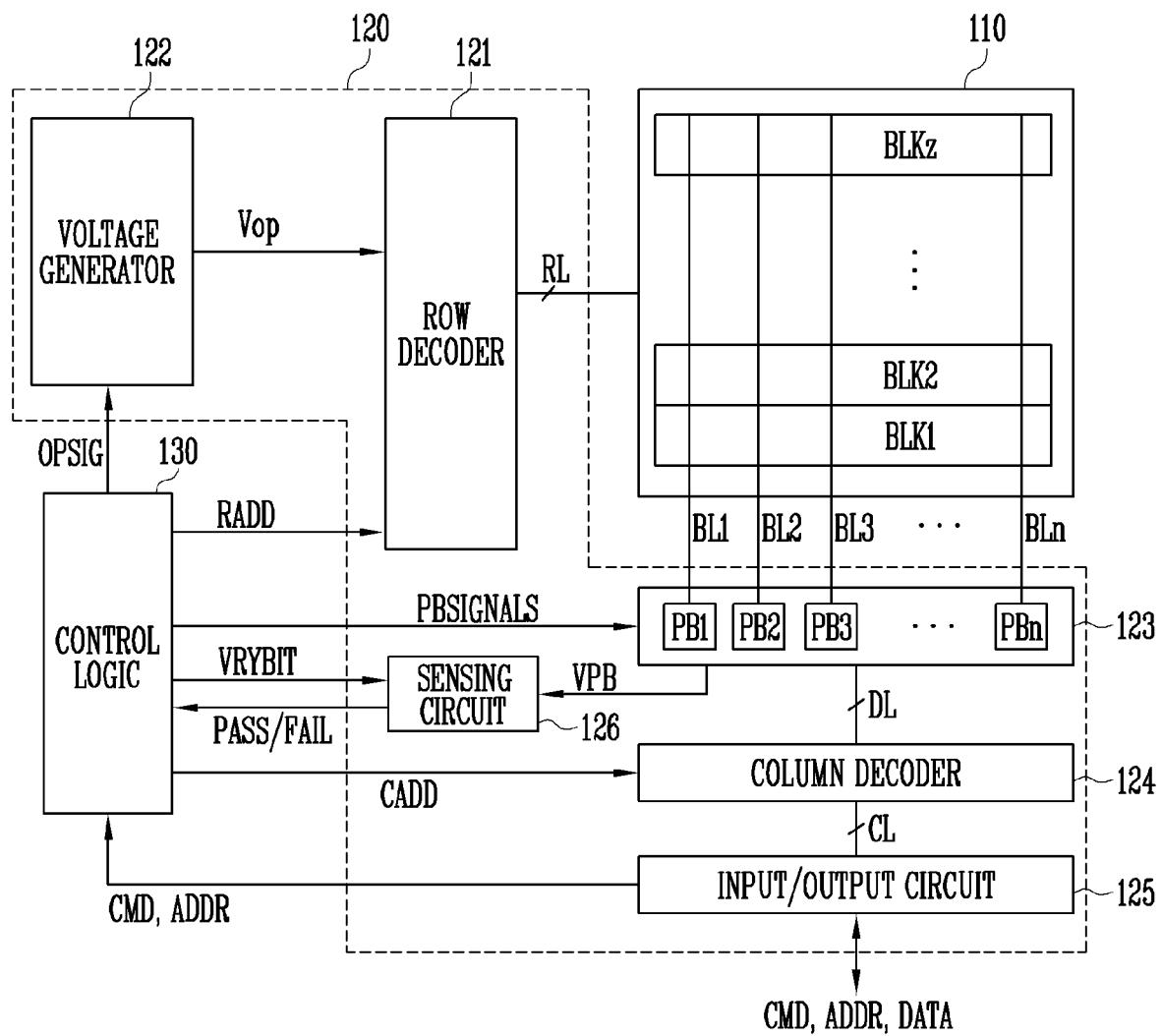
FIG. 4 is a diagram illustrating a structure of a memory device of FIG. 1 according to an embodiment of the disclosure.

FIG. 4 is a diagram illustrating a structure of the memory device of FIG. 1 according to an embodiment of the present disclosure.

Referring to FIG. 4, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are coupled to a row decoder 121 through row lines RL. Each of the memory blocks BLK1 to BLKz may be coupled to a page buffer group 123 through bit lines BL1 to BLn. Each of the memory blocks BLK1 to BLKz may include a plurality of memory cells. In an embodiment, the plurality of memory cells may be nonvolatile memory cells. Memory cells coupled to the same word line may be defined as a single page. Therefore, a single memory block may include a plurality of pages.

The row lines RL may include at least one source select line, a plurality of word lines, and at least one drain select line.

Each of the memory cells included in the memory cell array 110 may be implemented as a single-level cell (SLC) capable of storing one data bit, a multi-level cell (MLC) capable of storing two data bits, a triple-level cell (TLC) capable of storing three data bits, or a quadruple-level cell (QLC) capable of storing four data bits.

The peripheral circuit 120 may perform a program operation, a read operation, or an erase operation on a selected area of the memory cell array 110 under the control of the control logic 130. The peripheral circuit 120 may drive the memory cell array 110. For example, the peripheral circuit 120 may apply various operating voltages to the row lines RL and the bit lines BL1 to BLn or discharge the applied voltages under the control of the control logic 130.

The peripheral circuit 120 may include the row decoder 121, a voltage generator 122, the page buffer group 123, a column decoder 124, an input/output circuit 125, and a sensing circuit 126.

The row decoder 121 is coupled to the memory cell array 110 through the row lines RL. The row lines RL may include the at least one source select line, the plurality of word lines, and the at least one drain select line. In an embodiment, the word lines may include normal word lines and dummy word lines. In an embodiment, the row lines RL may further include a pipe select line.

The row decoder 121 may decode a row address RADD received from the control logic 130. The row decoder 121 selects at least one of the memory blocks BLK1 to BLKz according to the decoded address. Further, the row decoder 121 may select at least one word line WL of the selected memory block so that voltages generated by the voltage generator 122 are applied to the at least one word line WL according to the decoded address.

For example, during a program operation, the row decoder 121 may apply a program voltage to a selected word line and apply a program pass voltage having a level lower than that of the program voltage to unselected word lines. During a program verify operation, the row decoder 121 may apply a verify voltage to a selected word line and apply a verify pass voltage higher than the verify voltage to unselected word lines. During a read operation, the row decoder 121 may apply a read voltage to a selected word line and apply a read pass voltage higher than the read voltage to unselected word lines.

In an embodiment, the erase operation of the memory device 100 is performed on a memory block basis. During an erase operation, the row decoder 121 may select one memory block according to the decoded address. During the erase operation, the row decoder 121 may apply a ground voltage to word lines coupled to the selected memory block.

The voltage generator 122 may be operated under the control of the control logic 130. The voltage generator 122 may generate a plurality of voltages using an external supply voltage provided to the memory device 100. In detail, the voltage generator 122 may generate various operating voltages Vop that are used for program, read, and erase operations in response to an operation signal OPSIG. For example, the voltage generator 122 may generate a program voltage, a verify voltage, a pass voltages, a read voltage, an erase voltage, etc. under the control of the control logic 130.

In an embodiment, the voltage generator 122 may generate an internal supply voltage by regulating the external supply voltage. The internal supply voltage generated by the voltage generator 122 is used as an operating voltage for the memory device 100.

In an embodiment, the voltage generator 122 may generate a plurality of voltages using the external supply voltage or the internal supply voltage.

For example, the voltage generator 122 may include a plurality of pumping capacitors for receiving the internal supply voltage and generate a plurality of voltages by selectively enabling the plurality of pumping capacitors under the control of the control logic 130.

The generated voltages may be supplied to the memory cell array 110 by the row decoder 121.

The page buffer group 123 includes first to n-th page buffers PB1 to PBn. The first to n-th page buffers PB1 to PBn are coupled to the memory cell array 110 through the first to n-th bit lines BL1 to BLn. The first to n-th page buffers PB1 to PBn are operated under the control of the control logic 130. In detail, the first to n-th page buffers PB1 to PBn may be operated in response to page buffer control signals PBSIGNALS. For example, the first to n-th page buffers PB1 to PBn may temporarily store data received through the first to n-th bit lines BL1 to BLn or may sense voltages or currents of the bit lines BL1 to BLn during a read or verify operation.

In detail, during a program operation, when the program voltage is applied to the selected word line, the first to n-th page buffers PB1 to PBn may transfer the data DATA, received through the input/output circuit 125, to selected memory cells through the first to n-th bit lines BL1 to BLn. The memory cells in the selected page are programmed based on the received data DATA. During a program verify operation, the first to n-th page buffers PB1 to PBn may read page data by sensing the voltages or currents received through the first to n-th bit lines BL1 to BLn from the selected memory cells.

During a read operation, the first to n-th page buffers PB1 to PBn may read data DATA from the memory cells in the selected page through the first to n-th bit lines BL1 to BLn, and may output the read data DATA to the input/output circuit 125 under the control of the column decoder 124.

During the erase operation, the first to n-th page buffers PB1 to PBn may allow the first to n-th bit lines BL1 to BLn to float or may apply the erase voltage to the first to n-th bit lines BL1 to BLn.

The column decoder 124 may transfer data between the input/output circuit 125 and the page buffer group 123 in response to a column address CADD. For example, the column decoder 124 may exchange data with the first to n-th page buffers PB1 to PBn through data lines DL or may exchange data with the input/output circuit 125 through column lines CL.

The input/output circuit 125 may transfer a command CMD and an address ADDR, received from the memory controller (e.g., 200 of FIG. 1) described above with reference to FIG. 1, to the control logic 130, or may exchange data DATA with the column decoder 124.

During a read operation or a verify operation, the sensing circuit 126 may generate a reference current in response to an enable bit VRYBIT, and may compare a sensing voltage VPB received from the page buffer group 123 with a reference voltage generated by the reference current and then output a pass signal PASS or a fail signal FAIL.

The control logic 130 may control the peripheral circuit 120 by outputting the operation signal OPSIG, the row address RADD, the page buffer control signals PBSIGNALS, the enable bit VRYBIT, and the column address CADD in response to the command CMD and the address ADDR. In addition, the control logic 130 may determine whether a verify operation has passed or failed in response to the pass or fail signal PASS or FAIL.

The memory cells included in the memory cell array 110 may be programmed to any one of a plurality of programmed states depending on the data stored in each memory cell. A target programmed state of the corresponding memory cell may be determined to be any one of the plurality of programmed states depending on the data to be stored.

Figure 5:
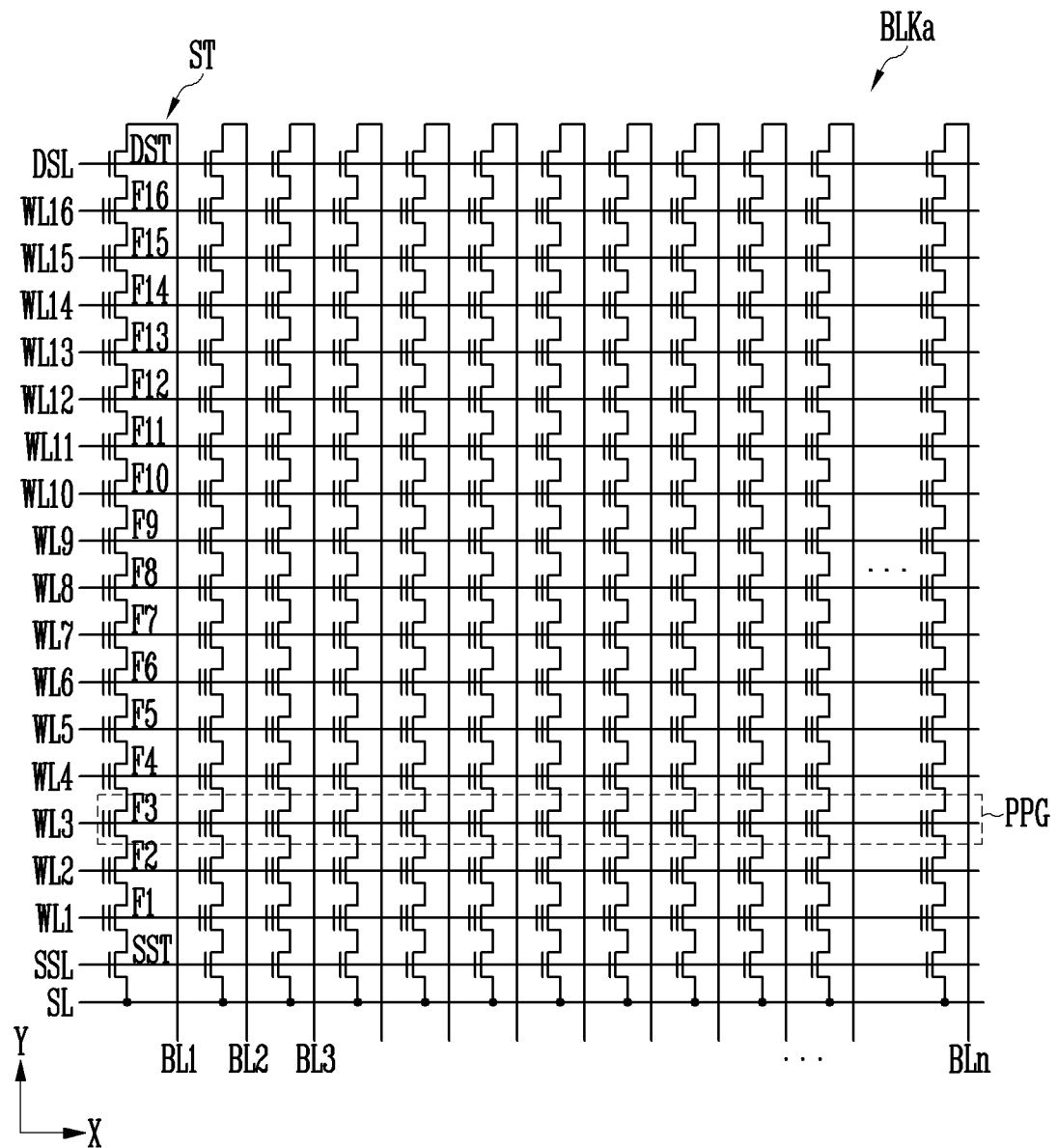
FIG. 5 is a diagram illustrating a memory block according to an embodiment of the disclosure.

FIG. 5 is a diagram illustrating a memory block according to an embodiment of the present disclosure.

Referring to FIGS. 4 and 5, FIG. 5 is a circuit diagram illustrating any one memory block BLKa of the plurality of memory blocks BLK1 to BLKz included in the memory cell array of FIG. 4 (e.g., memory cell array 110 of FIG. 4).

The memory block BLKa may be coupled to a first select line, word lines, and a second select line that are coupled in parallel to each other. For example, the word lines may be coupled in parallel to each other between the first and second select lines. Here, the first select line may be a source select line SSL, and the second select line may be a drain select line DSL.

In detail, the memory block BLKa may include a plurality of strings coupled between bit lines BL1 to BLn and a source line SL. The bit lines BL1 to BLn may be coupled to the strings, respectively, and the source line SL may be coupled in common to the strings. Because the strings may be equally configured, a string ST coupled to the first bit line BL1 will be described in detail as an example.

The string ST may include a source select transistor SST, a plurality of memory cells F1 to F16, and a drain select transistor DST which are coupled in series to each other between the source line SL and the first bit line BL1. A single string ST may include at least one source select transistor SST, memory cells F1 to F16, and at least one drain select transistor DST. The number of memory cells F1 to F16 shown in FIG. 5 are not limited, and other embodiments with a larger number of memory cells included in each string ST are contemplated by the disclosure.

A source of the source select transistor SST may be coupled to the source line SL, and a drain of the drain select transistor DST may be coupled to the first bit line BL1. The memory cells F1 to F16 may be coupled in series between the source select transistor SST and the drain select transistor DST. Gates of the source select transistors included in different strings may be coupled to the source select line SSL, gates of the drain select transistors included in different strings may be coupled to the drain select line DSL, and gates of the memory cells F1 to F16 may be coupled to a plurality of word lines WL1 to WL16, respectively. A group of memory cells coupled to the same word line, among the memory cells included in different strings, may be referred to as a "physical page: PPG". Therefore, the memory block BLKa may include a number of physical pages identical to the number of word lines WL1 to WL16.

One memory cell may store one bit of data. This cell is typically designated as a "single-level cell: SLC". Here, one physical page PPG may store data corresponding to one logical page LPG. The data corresponding to one logical page LPG may include a number of data bits identical to the number of memory cells included in one physical page PPG. Alternatively, one memory cell may store two or more bits of data. This cell is typically designated as a "multi-level cell: MLC". Here, one physical page PPG may store data corresponding to two or more logical pages LPG.

A memory cell which stores two or more bits of data in one memory cell is designated as a "multi-level cell". However, recently, with an increase in the number of data bits stored in one memory cell, the multi-level cell (MLC) may mean a memory cell in which two bits of data are stored, a memory cell in which three bits of data are stored is designated as a "triple-level cell (TLC)", and a memory cell in which four or more bits of data are stored is designated as a "quad-level cell (QLC)". In addition, a memory cell scheme in which multiple bits of data are stored has been developed, and the embodiment disclosed herein may be used in memory systems in which two or more bits of data are stored.

In an embodiment, each of the memory blocks may have a three-dimensional (3D) structure. Each of the memory blocks may include a plurality of memory cells stacked on a substrate. The plurality of memory cells are arranged in +X, +Y, and +Z directions, for example.

Figure 6A:
FIGS. 6A and 6B are diagrams illustrating types of data according to an embodiment of the disclosure.
Figure 6B:

FIGS. 6A and 6B are diagrams illustrating data according to embodiments of the disclosure.

Referring to FIGS. 6A and 6B, FIG. 6A illustrates host data HOST_DATA received from the host (e.g., host 300 of FIG. 2) and judgment data JUD_DATA generated based on the host data HOST_DATA. The host data HOST_DATA and the judgment data JUD_DATA may both be contained in the additional data (e.g., ADD_DATA of FIG. 2). FIG. 6B illustrates read data READ_DATA received from the memory device and detection data DET_DATA generated based on the read data READ_DATA.

Referring to FIG. 6A, the host data HOST_DATA may be received, together with a program request from the host, by memory controller 200. The host data HOST_DATA may be programmed to the memory device 100 in response to the program request. The host data HOST_DATA may be composed of a plurality of "0"s and "1"s.

In an embodiment, the judgment data JUD_DATA may be generated based on the host data HOST_DATA. The judgment data JUD_DATA may contain a first value obtained by summing a count value, which is generated by counting the number of 1s contained in the host data HOST_DATA, and a second value, which is obtained by performing a modulo operation on the address or index of a page in which the host data HOST_DATA is to be stored. That is, the second value may be a value obtained by converting the page address or index into a numerical value. Further, the modulo operation may be a method of calculating a remainder when a target value related to the address or index of a page is divided by a reference value. For example, if a target value corresponding the address or index is '30' and the reference value is '4', the result of the modulo operation is '2'. The judgment data JUD_DATA may be used to determine whether the host data HOST_DATA matches the read data READ_DATA.

In an embodiment, the host data HOST_DATA may be stored in a user area of the memory device. The user area may be an area of the memory device in which data to be programmed is stored, and not a spare area. Namely, the user area may be an area in which data to be programmed is stored, and the spare area is an area in which other data such as meta data is stored. Consequently, the host data HOST_DATA contained in the additional data may be stored in the user area, and the judgment data JUD_DATA may be stored in the spare area. The data stored in the spare area may not be changed or modified.

Referring to FIG. 6B, the read data READ_DATA may be data read from the memory device in response to a read request from the host. The read data READ_DATA may be composed of a plurality of "0"s and "1"s.

In an embodiment, the detection data DET_DATA may be generated using the read data READ_DATA. The detection data DET_DATA may contain a first value obtained by summing a count value, which is obtained by counting the number of 1s contained in the read data READ_DATA, and a second value, which is obtained by performing a modulo operation on the address or index of a page from which the read data READ_DATA is read. That is, the second value may be a value obtained by converting the page address or index into a numerical value. Further, the detection data DET_DATA may be data used to determine whether the read data READ_DATA matches the host data HOST_DATA.

In an embodiment, the read data READ_DATA may be received from the memory device (e.g., memory device 100 of FIG. 3), and may be transferred to the bit counter (e.g., bit counter 210 of FIG. 3) in the memory controller (e.g., memory controller 200 of FIG. 3). The bit counter may count the number of 1s contained in the read data READ_DATA. The count value generated by the bit counter may be included in the detection data DET_DATA.

Figure 7A:
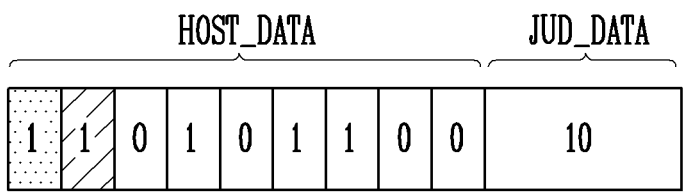
FIGS. 7A and 7B are diagrams illustrating examples of data of FIGS. 6A and 6B according to an embodiment of the disclosure.
Figure 7B:
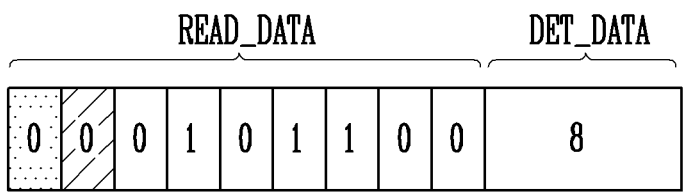

FIGS. 7A and 7B are diagrams illustrating examples of of data of FIGS. 6A and 6B according to an embodiment of the present disclosure.

Referring to FIGS. 7A and 7B, FIG. 7A illustrates an example of additional data (e.g., ADD_DATA of FIG. 2) containing host data HOST_DATA and judgment data JUD_DATA. FIG. 7B illustrates an example of read data READ_DATA received from the memory device (e.g., memory device 100 of FIG. 3) and detection data DET_DATA generated based on the read data READ_DATA.

In FIG. 7A, a first value is obtained by performing a modulo operation on the index or address of a page to which the host data HOST_DATA is to be programmed. In FIG. 7B, a second value is obtained by performing a modulo operation on the index or address of a page from which data is read. In an example, both the first value and the second value are "5".

FIG. 7A, it can be seen that host data received from the host (e.g., host 300 of FIG. 2) is "110101100". That is, the memory controller (e.g., memory controller 200 of FIG. 2) may receive the host data HOST_DATA of "110101100" from the host and output the host data to the memory device (e.g., memory device 100 of FIG. 2), and the memory device may program the host data of "110101100".

In an embodiment, the judgment data JUD_DATA may be generated based on the host data HOST_DATA of "110101100" received from the host. For example, because the number of 1s contained in the host data HOST_DATA of "110101100" is 5, and the first value obtained by performing a modulo operation on the index or address of the page to which the host data HOST_DATA is to be programmed is also 5, the judgment data JUD_DATA may be "10", which is the sum of the number of 1s contained in the host data HOST_DATA and the first value that was obtained by performing a modulo operation on the index or address of the page to which the host data HOST_DATA is to be programmed.

In an embodiment, the host data of "110101100" may be programmed to the user area of the memory device, and the judgment data JUD_DATA may be programmed to the spare area. In another embodiment, the judgment data JUD_DATA may be stored in the additional data generator 230 included in the memory controller 200 of FIG. 2.

In FIG. 7B, the read data READ_DATA, read from a memory device, may be "000101100". That is, the memory controller may output a read command, corresponding to a read request received from the host, to the memory device, and the memory device may output "000101100", which is data stored in the memory device, to the memory controller in response to the read command.

In an embodiment, the detection data DET_DATA may be generated based on the read data READ_DATA of "000101100" received from the memory device. For example, because the number of 1s contained in the read data READ_DATA of "000101100" is 3, and a second value obtained by performing a modulo operation on the index or address of the page from which the read data is read is 5, the detection data DET_DATA may be "8", which is the sum of the number of 1s contained in the read data READ_DATA and the value obtained by performing a modulo operation on the index or address of the page from which the read data READ_DATA is read.

In an embodiment, the read data READ_DATA of "000101100" may be transferred to the bit counter of the memory controller, and the bit counter may count the number of 1s contained in the read data READ_DATA. The bit counter may generate detection data DET_DATA using the total number of 1s and the value obtained by performing a modulo operation on the index or address of the page from which the read data is read.

When data is read from the memory device, an error correction operation may be performed on the read data READ_DATA. For example, when as a result of performing the error correction operation by the memory controller, it is determined that error correction is not possible, the judgment data JUD_DATA may be compared with the detection data DET_DATA.

In an embodiment, because the judgment data JUD_DATA is "10" and the detection data DET_DATA is "8", the judgment data JUD_DATA is not identical to the detection data DET_DATA. Because the judgment data JUD_DATA and the detection data DET_DATA are not identical to each other, the memory controller may perform an operation of correcting uncorrectable errors. More specifically, the read data controller included in the memory controller may perform the operation of correcting the uncorrectable errors.

The operation of correcting errors will be described in detail below with reference to FIGS. 8A and 8B.

FIGS. 8A and 8B are diagrams illustrating an operation of correcting an uncorrectable error according to an embodiment of the present disclosure.

Referring to FIGS. 8A and 8B, FIGS. 8A and 8B illustrate changed data when a read command corresponding to a read request from the host (e.g., host 300 of FIG. 1) is executed, and an error in read data is determined to be an uncorrectable error. In an example, the read data (e.g., READ_DATA of FIG. 7B) may be changed to that of FIG. 8A and then changed to that of FIG. 8B.

Referring to FIG. 8A, the read data controller (e.g., read data controller 250 of FIG. 1) may change the read data READ_DATA "000101100" in FIG. 7B into first read data READ_DATA1 of FIG. 8A. The read data controller (e.g., 250 of FIG. 1) may change "0" contained in the read data to "1" bit by bit until all errors are corrected. Here, the operation of the read data controller may be performed when the error in the read data is determined to be an uncorrectable error by the error corrector (e.g., error corrector 260 of FIG. 1). That is, when the read data controller receives comparison information COM_INF from the comparator (e.g., comparator 240 of FIG. 1) and receives uncorrectable error information UECC_INF from the error corrector (e.g., error corrector 260 of FIG. 1), the read data controller—may change "0" contained in the read data to "1" one bit at a time until the errors are corrected.

In an embodiment, the read data controller may determine whether "0" is contained in the read data READ_DATA at a starting position. Therefore, the read data controller may generate first read data READ_DATA1 in which "0" at the start position of the read data READ_DATA is changed to "1". That is, the first read data READ_DATA1 may be "100101100" as illustrated in FIG. 8A.

The memory controller may determine whether the error has been corrected based on the first read data READ_DATA1 generated by the read data controller. However, because the first read data READ_DATA1 does not match the host data (e.g., HOST_DATA of FIG. 7A), the error has not been corrected.

Referring to FIG. 8B, the read data controller may change the first read data READ_DATA1 of "100101100" in FIG. 8A into second read data READ_DATA2. The read data controller may change the first "0" in the first read data READ_DATA1 to "1".

In an embodiment, the read data controller may determine whether "0" is at a starting position of the first read data READ_DATA1. If not, then the read data controller may generate second read data READ_DATA2 in which the next "0" is changed to "1" in the first read data READ_DATA1. That is, the second read data READ_DATA2 may be "110101100".

The memory controller may determine whether the error has been corrected based on the second read data READ_DATA2 generated by the read data controller. Because the second read data READ_DATA2 matches the host data (e.g., HOST_DATA of FIG. 7A), the uncorrectable error has been corrected.

As a result, even if uncorrectable errors occur only in some bits contained in the read data, the data bits may be corrected according to embodiments of the present disclosure.

FIG. 9 is a flowchart illustrating an operation of a memory controller according to an embodiment of the present disclosure.

Referring to FIG. 9, at step S901, the memory controller may receive host data from a host. The host data may be received together with a program request. The host data may be data to be programmed to the memory device. Therefore, the memory controller may output a program command corresponding to a program request and the host data to the memory device, and the memory device may program the host data in response to the program command. The host data may be composed of "0"s and "1"s.

At step S903, the memory controller may generate a count value by counting the number of 1s contained in the host data. The host data may be composed of "0"s and "1"s, and the memory controller may count only the number of 1s in the host data. In another embodiment, the memory controller may generate a count value by counting the number of 0s contained in the host data. The memory controller may generate additional data based on the count value.

At step S905, the memory controller (specifically, the additional data generator) may receive information about a page in which the host data is to be stored. The page in which the host data is to be stored may be a page corresponding to a physical address translated from a logical address received from the host.

In an embodiment, the page information may contain a value obtained by performing a modulo operation on the address or index of the page in which the host data is to be stored. That is, the judgment data to be generated based on the page information may secure a value as large as the value obtained by performing a modulo operation on the address or index of the page in which the host data is to be stored. In other words, the judgment data may be a value larger than the value obtained by performing the modulo operation. Here, the value obtained by performing the modulo operation may be obtained by converting the page address or index into a numerical value and by dividing the numerical value with a reference value.

At step S907, the memory controller may generate judgment data based on the count value and the page information. The judgment data may be data for determining whether the host data matches the read data during the read operation. The judgment data may be generated based on the number of 1s contained in the host data received from the host and the index or address of a page to which the host data is to be programmed. In an embodiment, the judgment data may be generated based on the number of 0s contained in the host data and the index or address of the page to which the host data is to be programmed.

At step S909, the memory controller may output the host data and the judgment data. In order to execute the program command corresponding to the program request from the host, the memory controller may output the host data and the judgment data together with the program command corresponding to the program request. That is, the host data may be program data. The host data may be programmed to a user area of the memory device. The judgment data may be programmed to a spare area of the memory device.

FIG. 10 is a flowchart illustrating an operation of a memory controller according to an embodiment of the present disclosure.

FIG. 10 is a flowchart illustrating a case where a read operation corresponding to a read request received from the host is performed after host data and judgment data have been programmed to the memory device.

At step S1001, the memory controller may receive read data from the memory device in response to a read request received from the host. The read data may be data read from the memory device when the memory device executes a read command corresponding to the read request received from the host. When the data is read from the memory device, the memory controller may perform an error correction operation on the read data at step S1003.

The data received from the memory device may include errors. That is, data different from the data programmed to the memory device may be read. In detail, the host data received from the host may be changed during a program process or a read process.

In an embodiment, the memory controller may receive data different from the host data through a read operation. Therefore, an error correction operation may be performed on the read data. The error correction operation may be performed using Bose-Chaudhuri-Hocquenghem (BCH) codes or Low-density parity-check (LDPC) codes. Also, the error correction operation may be a read-retry operation.

At step S1005, the memory controller may determine whether uncorrectable errors have occurred in the read data. That is, even if the memory controller has performed the error correction operation on the read data, errors may not be corrected. When errors are not yet corrected, uncorrectable errors may occur.

When uncorrectable errors do not occur, the memory controller may output the corrected read data to the host at step S1007. When the uncorrectable errors have occurred, the memory controller may compare judgment data stored in the memory device or in the memory controller with detection data generated based on the read data received from the memory device at step S1009. The judgment data may be generated based on the host data and the index or address of a page in which the host data is to be stored. The detection data may be generated based on the read data, read from the memory device, and the index or address of the page from which the read data is read.

At step S1011, the memory controller may generate comparison information based on the judgment data and the detection data. In detail, when the judgment data is identical to the detection data, comparison information may not be generated. When the judgment data is not identical to the detection data, the comparison information may be generated. The comparison information may have information including the difference between the judgment data and the detection data.

In an embodiment, the comparison information may include the difference between the number of 1s contained in the host data and the number of 1s contained in the read data. Therefore, the memory controller may perform an operation of correcting uncorrectable errors based on the comparison information.

Figure 11:
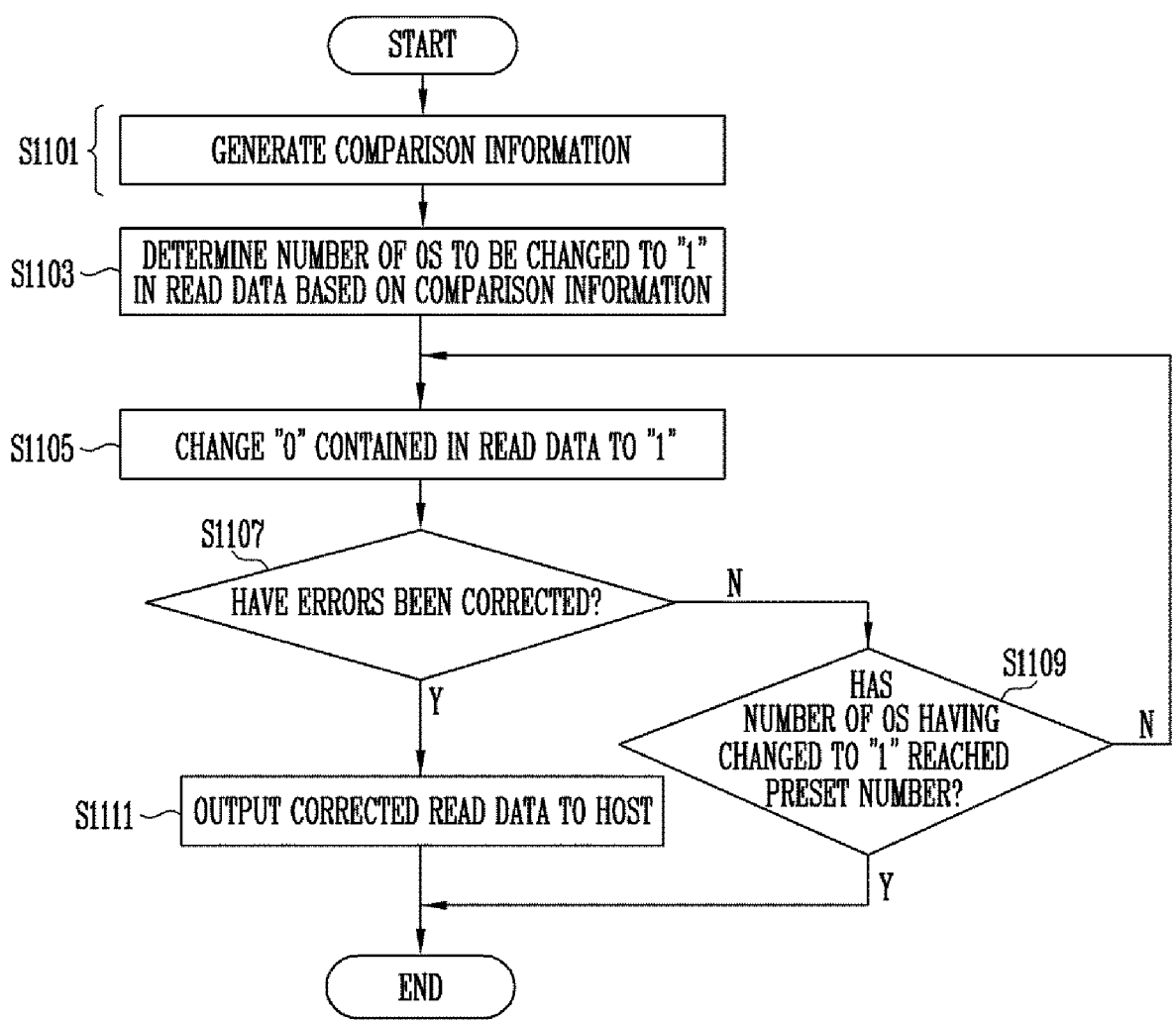
FIG. 11 is a flowchart illustrating an operation of a memory controller according to an embodiment of the present disclosure.

FIG. 11 is a flowchart illustrating the operation of a memory controller according to an embodiment of the present disclosure.

Referring to FIG. 11, at step S1101, the memory controller may generate comparison information based on judgment data and detection data.

At step S1103, the memory controller may determine the number of 0s to be changed to "1" in the read data based on the comparison information. For example, when the difference between the judgment data and the detection data, included in the comparison information, is "2", the memory controller may set the number of 0s to be changed in the read data to '2'. When the memory controller sets the number of 0s to be changed to "1" in the read data, "0" contained in the read data may be changed to "1" at step S1105.

At step S1107, whether errors in the changed read data have been corrected may be determined. When errors in the changed read data are corrected, the memory controller may output the corrected read data to the host at step S1111. In contrast, when errors in the changed read data are not corrected, the memory controller may determine whether the number of 0s having changed to "1" has reached a preset number at step S1109. The preset number may be the number of 0s to be changed to "1", which has been set based on the comparison information.

In an embodiment, when the number of 0s having changed to "1" has reached the preset number, the corresponding data may be processed as error-uncorrectable data. However, when the number of 0s having changed to "1" has not reached the preset number, the memory controller may change one "0" contained in the read data to "1" at step S1105, and may determine whether all errors in the changed read data have been corrected at step S1107. If errors in the changed read data have not yet been corrected, then the memory controller may change "0" in the read data to "1" until the number of 0s having changed to "1" has reached the preset number at step S1105.

Figure 12:
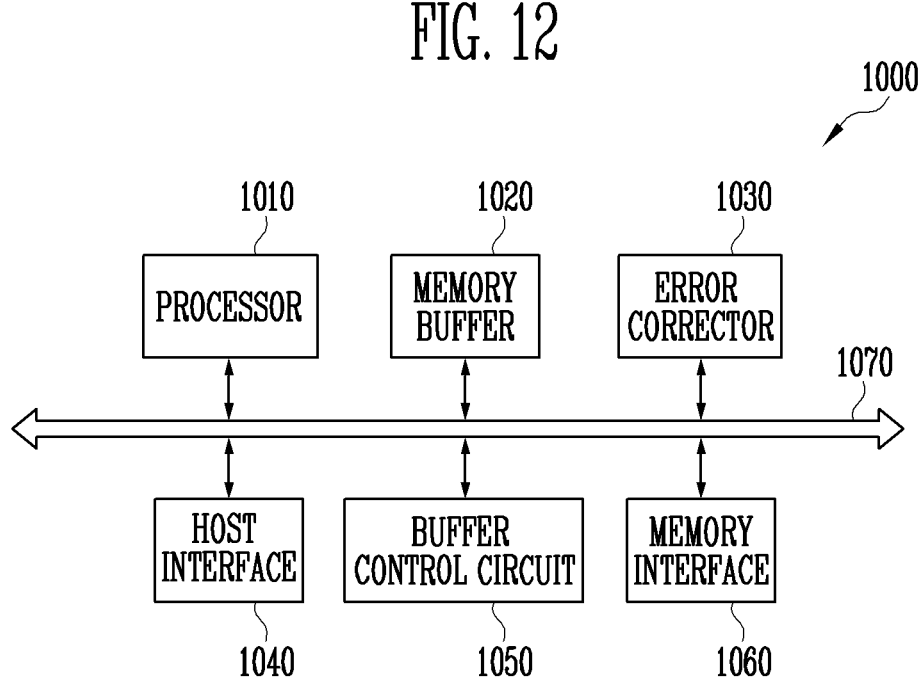
FIG. 12 is a diagram illustrating a memory controller of FIG. 1 according to an embodiment of the disclosure.

FIG. 12 is a diagram illustrating a memory controller of FIG. 1 according to an embodiment of the present disclosure.

A memory controller 1000 is coupled to a host and a memory device. In response to a request received from the host, the memory controller 1000 may access the memory device. For example, the memory controller 1000 may be configured to control write, read, erase, and background operations of the memory device. The memory controller 1000 may provide an interface between the memory device and the host. The memory controller 1000 may run firmware for controlling the memory device.

Referring to FIG. 12, the memory controller 1000 may include a processor 1010, a memory buffer 1020, an error corrector (error correction code: ECC) 1030, a host interface 1040, a buffer control circuit 1050, a memory interface 1060, and a bus 1070.

The bus 1070 may provide channels between components of the memory controller 1000.

The processor 1010 may control the overall operation of the memory controller 1000 and may perform a logical operation. The processor 1010 may communicate with an external host through the host interface 1040 and also communicate with the memory device through the memory interface 1060. Further, the processor 1010 may communicate with the memory buffer 1020 through the buffer control circuit 1050. The processor 1010 may control the operation of the storage device by using the memory buffer 1020 as a working memory, a cache memory or a buffer memory.

The processor 1010 may perform the function of a flash translation layer (FTL). The processor 1010 may translate a logical block address (LBA), provided by the host, into a physical block address (PBA) through the flash translation layer (FTL). The flash translation layer (FTL) may receive the LBA using a mapping table and translate the LBA into the PBA. Examples of an address mapping method performed through the flash translation layer (FTL) may include various methods according to a mapping unit. Representative address mapping methods include a page mapping method, a block mapping method, and a hybrid mapping method.

The processor 1010 may randomize data received from the host. For example, the processor 1010 may use a randomizing seed to randomize data received from the host. The randomized data may be provided, as data to be stored, to the memory device and may be programmed in the memory cell array.

The processor 1010 may derandomize data received from the memory device during a read operation. For example, the processor 1010 may derandomize the data received from the memory device using a derandomizing seed. The derandomized data may be output to the host.

The processor 1010 may receive host data to be programmed data to the memory device from the host, and may output judgment data based on the host data. The judgment data may be a value obtained by summing the number of 1s contained in the host data and a value obtained by performing a modulo operation on the index or address of a page to which the host data is to be programmed.

The processor 1010 may receive read data from the memory device during a read operation, and may output detection data based on the read data. The detection data may be a value obtained by summing the number of 1s contained in the read data and a value obtained by performing a modulo operation on the index or address of a page on which the read operation is performed.

When errors are not corrected even if the error corrector 1030 performs error correction on the read data, the processor 1010 may compare the judgment data with the detection data, and may determine the number of 0s to be changed to "1". The processor 1010 may perform an operation of correcting uncorrectable errors based on the judgment data and the detection data.

The processor 1010 may run software or firmware to perform the randomizing or derandomizing operation.

In an embodiment, the processor 1010 may run software or firmware to perform randomizing and derandomizing operations.

The memory buffer 1020 may be used as a working memory, a cache memory, or a buffer memory of the processor 1010. The memory buffer 1020 may store codes and commands executed by the processor 1010. The memory buffer 1020 may store data that is processed by the processor 1010. The memory buffer 1020 may include a static RAM (SRAM) or a dynamic RAM (DRAM).

The error corrector 1030 may perform error correction. The error corrector 1030 may perform error correction code (ECC) encoding based on data to be written to the memory device through the memory interface 1060. The ECC-encoded data may be transferred to the memory device through the memory interface 1060. The error corrector 1030 may perform ECC decoding based on data received from the memory device through the memory interface 1060. In an example, the error corrector 1030 may be included as the component of the memory interface 1060 in the memory interface 1060.

The host interface 1040 may communicate with the external host under the control of the processor 1010. The host interface 1040 may perform communication using at least one of various communication methods such as Universal Serial Bus (USB), Serial AT Attachment (SATA), Serial Attached SCSI (SAS), High Speed Interchip (HSIC), Small Computer System Interface (SCSI), Peripheral Component Interconnection (PCI), PCI express (PCIe), Nonvolatile Memory express (NVMe), Universal Flash Storage (UFS), Secure Digital (SD), MultiMedia Card (MMC), embedded MMC (eMMC), Dual In-line Memory Module (DIMM), Registered DIMM (RDIMM), and Load Reduced DIMM (LRDIMM) communication methods by way of non-limiting examples.

The buffer control circuit 1050 may control the memory buffer 1020 under the control of the processor 1010.

The memory interface 1060 may communicate with the memory device under the control of the processor 1010. The memory interface 1060 may transmit/receive commands, addresses, and data to/from the memory device through channels.

In an embodiment, the memory controller 1000 does not include the memory buffer 1020 and the buffer control circuit 1050.

In an embodiment, the processor 1010 may control the operation of the memory controller 1000 using codes. The processor 1010 may load codes from a nonvolatile memory device (e.g., ROM) provided in the memory controller 1000. In an embodiment, the processor 1010 may load codes from the memory device through the memory interface 1060.

In an embodiment, the bus 1070 of the memory controller 1000 may be divided into a control bus and a data bus. The data bus may be configured to transmit data in the memory controller 1000, and the control bus may be configured to transmit control information such as commands or addresses in the memory controller 1000. The data bus and the control bus may be isolated from each other, and may neither interfere with each other nor influence each other. The data bus may be coupled to the host interface 1040, the buffer control circuit 1050, the error corrector 1030, and the memory interface 1060. The control bus may be coupled to the host interface 1040, the processor 1010, the buffer control circuit 1050, the memory buffer 1020, and the memory interface 1060.

Figure 13:
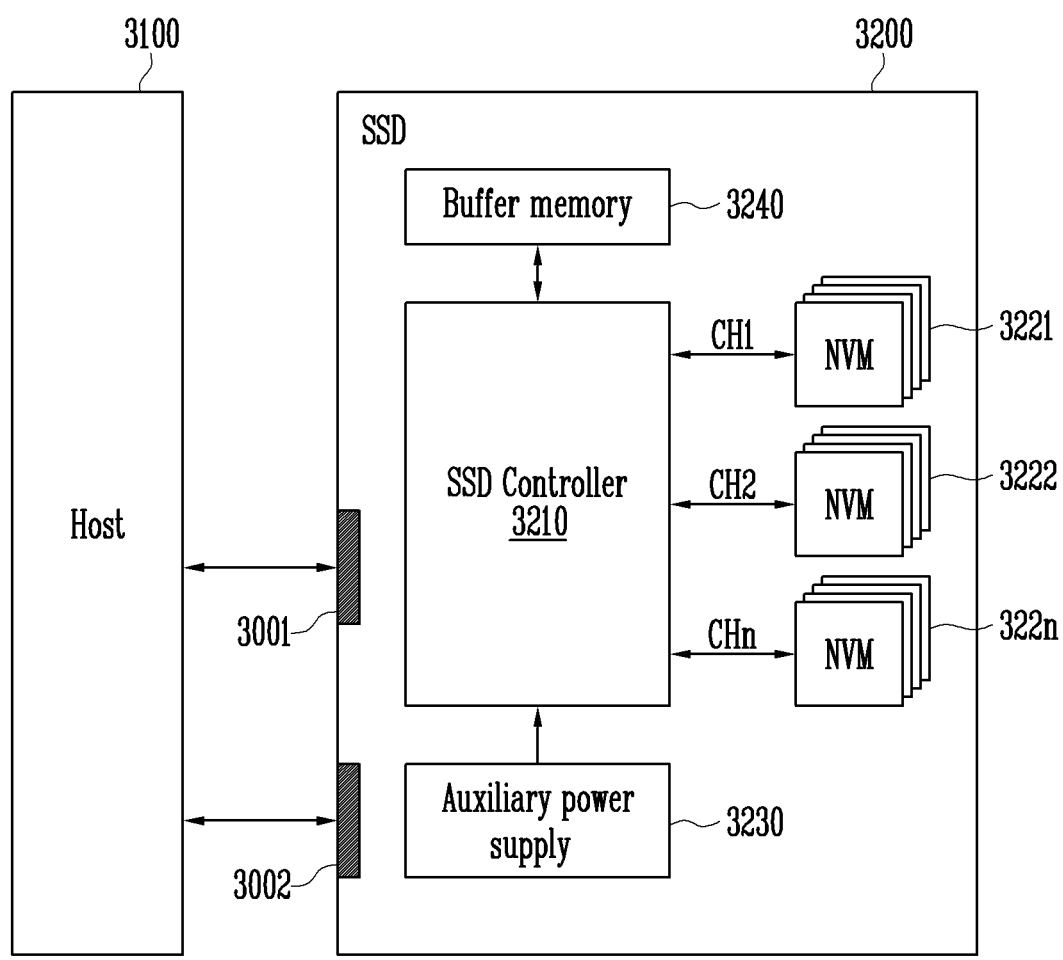
FIG. 13 is a block diagram illustrating an example of a solid state drive (SSD) system that uses a storage device according to an embodiment of the present disclosure.

FIG. 13 is a block diagram illustrating an example of a solid state drive (SSD) system to which the storage device according to an embodiment of the present disclosure is applied.

Referring to FIG. 13, an SSD system 3000 may include a host 3100 and an SSD 3200. The SSD 3200 may exchange signals SIG with the host 3100 through a signal connector 3001 and may receive power PWR through a power connector 3002. The SSD 3200 may include an SSD controller 3210, a plurality of flash memories 3221 to 322n, an auxiliary power supply 3230, and a buffer memory 3240.

In an embodiment, the SSD controller 3210 may perform the function of the memory controller 200 described above with reference to FIG. 1.

The SSD controller 3210 may control the plurality of flash memories 3221 to 322n in response to the signals SIG received from the host 3100. In an embodiment, the signals SIG may be signals based on the interfaces of the host 3100 and the SSD 3200. For example, the signals SIG may be signals defined by at least one of various interfaces such as universal serial bus (USB), multi-media card (MMC), embedded MMC (eMMC), peripheral component interconnection (PCI), PCI-express (PCI-E), advanced technology attachment (ATA), serial-ATA (SATA), parallel-ATA (PATA), small computer system interface (SCSI), enhanced small disk interface (ESDI), integrated drive electronics (IDE), Firewire, universal flash storage (UFS), Wi-Fi, Bluetooth, or nonvolatile memory express (NVMe) interfaces.

The SSD controller 3210 may convert a request received from the host 3100 into a command usable in the SSD system 3000, and may output the command. For example, when a refresh request is received from the host 3100, the SSD controller 3210 may convert the refresh request into a refresh command, and may output the refresh command to the flash memories 3221 to 322n. Alternatively, even if the refresh request is not received from the host 3100, the SSD controller 3210 may output the refresh command at preset intervals during the background operation.

When errors are not corrected even if the SSD controller 3210 performs error correction on the data read from the plurality of flash memories 3221 to 322n, the SSD controller 3210 may determine the number of 0s to be changed to "1" in the read data based on host data received from the host 3100 and the read data. The SSD controller 3210 may perform an operation of correcting uncorrectable errors based on the host data and the read data.

The auxiliary power supply 3230 may be coupled to the host 3100 through the power connector 3002. The auxiliary power supply 3230 may be supplied with power PWR from the host 3100 and may be charged. The auxiliary power supply 3230 may supply the power of the SSD 3200 when the supply of power from the host 3100 is not smoothly performed. In an embodiment, the auxiliary power supply 3230 may be positioned inside the SSD 3200 or positioned outside the SSD 3200. For example, the auxiliary power supply 3230 may be disposed in a main board and may supply auxiliary power to the SSD 3200.

The buffer memory 3240 functions as a buffer memory of the SSD 3200. For example, the buffer memory 3240 may temporarily store data received from the host 3100 or data received from the plurality of flash memories 3221 to 322n or may temporarily store metadata (e.g., mapping tables) of the flash memories 3221 to 322n. The buffer memory 3240 may include volatile memories such as DRAM, SDRAM, DDR SDRAM, LPDDR SDRAM, and GRAM or nonvolatile memories such as FRAM, ReRAM, STT-MRAM, and PRAM for example.

In accordance with the present disclosure, there are provided a memory controller that enables uncorrectable errors to be corrected and a method of operating the memory controller.

While the exemplary embodiments of the present disclosure have been disclosed for illustrative purposes, those skilled in the art will appreciate that various modifications, additions and substitutions are possible without departing from the scope and spirit of the present disclosure. The scope of the present disclosure may therefore be defined by the appended claims and equivalents of the claims rather than by the descriptions preceding them.

In the above-discussed embodiments, any given step may be selectively performed or skipped. In addition, the steps in each embodiment may need always be sequentially performed in given order, and may be randomly performed. Furthermore, the embodiments disclosed in the present specification and the drawings aims to help those with ordinary knowledge in this art more clearly understand the present disclosure rather than aiming to limit the bounds of the present disclosure. In other words, one of ordinary skill in the art to which the present disclosure belongs will be able to easily understand that various modifications are possible based on the technical scope of the present disclosure.

Embodiments of the present disclosure have been described with reference to the accompanying drawings, and specific terms or words used in the description should be construed in accordance with the spirit of the present disclosure without limiting the subject matter thereof. It should be understood that many variations and modifications of the basic inventive concept described herein will still fall within the spirit and scope of the present disclosure as defined in the appended claims and their equivalents.

What is claimed is:

1. A memory controller for controlling a memory device that stores data, comprising:
    a bit counter configured to generate a first count value by counting a number of bits in a host data to be programmed at an address in the memory device in response to a program request received from a host;
    a flash translation layer configured to generate a first page information indicating the address of the programmed data stored in the memory device;
    an additional data generator configured to generate a judgment data based on the first count value and the first page information;
    a comparator configured to generate a comparison information by comparing the judgment data with detection data, wherein the detection data is generated using the programmed data read from the memory device in response to a read request received from the host; and
    a read data controller configured to perform an operation of correcting an error in the programmed data read from the memory device based on the comparison information.

2. The memory controller according to claim 1, wherein the additional data generator generates the judgment data by summing the first count value and a value included in the first page information.

3. The memory controller according to claim 2, wherein the additional data generator outputs an additional data that includes the judgment data and the host data received from the host.

4. The memory controller according to claim 1, wherein the additional data generator is configured to, when the error in the programmed data read from the memory device is an uncorrectable error, output the judgment data to the comparator.

5. The memory controller according to claim 1, wherein the bit counter is configured to, during a read operation of the memory device, generate a second count value by counting a number of bits in the programmed data read from the memory device.

6. The memory controller according to claim 5, wherein the bit counter is configured to, during the read operation of the memory device, generate a second page information that indicates an address of the programmed data read from the memory device and generate a value of the detection data by summing the second count value and a value included in the second page information.

7. The memory controller according to claim 6, wherein the comparator generates the comparison information by determining whether the value of the judgment data is identical to the value of the detection data.

8. The memory controller according to claim 7, wherein the comparator receives the judgment data stored in the additional data generator and generates the comparison information.

9. The memory controller according to claim 7, wherein the comparator receives the judgment data stored in the memory device and generates the comparison information.

10. The memory controller according to claim 7, wherein the read data controller is configured to, when the value of the judgment data is not identical to the value of the detection data, change a bit contained in the programmed data read from the memory device.

11. The memory controller according to claim 10, wherein the read data controller determines, based on the changed bit, whether the error in the programmed data read from the memory device has been corrected.

12. The memory controller according to claim 11, wherein the read data controller is configured to, when it is determined that the error in the programmed data read from the memory device has not been corrected, change any one bit other than the changed bit, among bits contained in the programmed data read from the memory device.

13. A method of operating a memory controller for controlling a memory device that stores data, the method comprising:
    receiving host data from a host;
    generating a first count value by counting a bit in a programmed state or an erased state contained in the host data;
    generating a first page information indicating an address of a page in which the host data is to be stored, among pages included in the memory device;
    generating judgment data based on the first count value and the first page information;
    generating detection data based on programmed data read from the memory device;
    generating comparison information by comparing the judgment data with the detection data; and
    performing an operation of correcting an error in the programmed data read from the memory device based on the comparison information.

14. The method according to claim 13, wherein the judgment data includes a value by summing the first count value and a value included in the first page information.

15. The method according to claim 14, further comprising:
    outputting additional data that includes the judgment data and the host data so as to program the additional data to the memory device.

16. The method according to claim 13, wherein generating the detection data comprises:
    during a read operation of the memory device, generating a second count value by counting any one of bits in a programmed state and an erased state contained in the programmed data read from the memory device; and
    generating a second page information that includes a value indicating information about an address at which the read operation is performed.

17. The method according to claim 16, wherein the detection data includes a value by summing the second count value and the value included in the second page information.

18. The method according to claim 16, wherein generating the comparison information comprises generating information for determining whether the value of the judgment data is identical to the value of the detection data.

19. The method according claim 18, wherein performing the operation of correcting the error in the programmed data read from the memory device comprises, when the value of the judgment data is not identical to the value of the detection data, changing any one of bits contained in the programmed data read from the memory device.

20. The method according claim 19, wherein performing the operation of correcting the error in the programmed data read from the memory device further comprises:
   determining, based on the changed bit, whether the error in the read data has been corrected; and
   when it is determined that the error in the read data has not been corrected, changing any one bit other than the changed bit, among bits contained in the programmed data read from the memory device.

\* \* \* \* \*